(12) United States Patent
Hun et al.

(10) Patent No.: US 12,180,391 B2
(45) Date of Patent: Dec. 31, 2024

(54) PREINSTALLED SEALANT FOR PREFAB COMPONENTS

(71) Applicant: UT-Battelle, LLC, Oak Ridge, TN (US)

(72) Inventors: Diana Hun, Oak Ridge, TN (US); Pengfei Cao, Oak Ridge, TN (US); Xiao Zhao, Oak Ridge, TN (US); Zoriana Demchuk, Oak Ridge, TN (US); Jiancheng Luo, Oak Ridge, TN (US); Tomonori Saito, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 486 days.

(21) Appl. No.: 17/591,886

(22) Filed: Feb. 3, 2022

(65) Prior Publication Data

US 2022/0243103 A1     Aug. 4, 2022

Related U.S. Application Data

(60) Provisional application No. 63/145,517, filed on Feb. 4, 2021.

(51) Int. Cl.
| | |
|---|---|
| *C09J 133/12* | (2006.01) |
| *C09J 5/00* | (2006.01) |
| *C09J 11/08* | (2006.01) |
| *C09J 133/08* | (2006.01) |

(52) U.S. Cl.
CPC ............... *C09J 133/12* (2013.01); *C09J 5/00* (2013.01); *C09J 11/08* (2013.01); *C09J 133/08* (2013.01); *C09J 2433/00* (2013.01); *C09J 2463/00* (2013.01); *C09J 2475/00* (2013.01)

(58) Field of Classification Search
CPC . C09J 133/12; C09J 133/08; C09J 5/00; C09J 11/08; C09J 2433/00; C09J 2463/00; C09J 2475/00
See application file for complete search history.

(56) References Cited

U.S. PATENT DOCUMENTS

| | | | | |
|---|---|---|---|---|
| 7,644,553 | B2 * | 1/2010 | Knauseder | C09J 5/04 52/592.1 |
| 7,897,005 | B2 * | 3/2011 | Knauseder | E04F 15/04 156/304.5 |
| 2002/0046526 | A1 * | 4/2002 | Knauseder | C09J 5/04 52/581 |
| 2002/0148551 | A1 * | 10/2002 | Knauseder | E04F 15/04 156/303.1 |
| 2022/0090374 | A1 * | 3/2022 | Yelle | B27N 3/04 |

* cited by examiner

*Primary Examiner* — Mark R Wendell
(74) *Attorney, Agent, or Firm* — WARNER NORCROSS + JUDD LLP

(57) ABSTRACT

A joint sealing system for prefabricated building components is provided. The joint sealing system includes a first component including a first surface, and a second component including a second surface that is mateable with the first surface. The first and second surfaces define a joint. A sealant composition is disposed on one of the first surface or the second surface. Pressure exerted when the second surface is mated with the first surface triggers curing of the sealant composition to join the first and second components and to seal the joint between the first and second components. A method of joining and sealing two prefabricated building components is also provided.

20 Claims, 5 Drawing Sheets

PREINSTALLED SEALANT FOR PREFAB COMPONENTS

CROSS-REFERENCE TO RELATED APPLICATIONS

This application claims the benefit of U.S. Provisional Application 63/145,517, filed Feb. 4, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in the invention.

FIELD OF THE INVENTION

The present invention relates to a joint system for two prefabricated components and a method of sealing a joint between two prefabricated components.

BACKGROUND OF THE INVENTION

Prefabricated ("prefab") construction is a building construction method in which the assembly of module and panel components is conducted in a controlled environment that enables better monitoring and enforcement of quality control. Prefabricated buildings are either residential or non-residential structures having components or units (e.g., wall, roof, and floor modules) that are manufactured in a factory or manufacturing plant, then transferred to a construction site and assembled on-site to form the complete building. Common prefabricated building applications include single-detached homes, apartments, office spaces, schools, temporary construction facilities, medical camps, and evacuation centers. One deficiency in prefab construction is the work performed at the construction site at which the prefab components are joined to construct a building. In particular, the joints between panels or modules must be sealed to maintain continuity of the air and water resistive barrier. Air barriers are important because air leakage through the building envelope is responsible for approximately 13% of the energy used in homes and approximately 6% of the energy used in commercial buildings. Thus, sealants are essential components in prefab building construction. The sealants maintain the continuity of the air and water barrier along the joints to prevent fluids (e.g., air, water), dust, sound, and insects from passing through material surfaces or joints. Current sealing methods in prefab building construction are time consuming and highly dependent upon the skill of the installer. For example, the joints of prefab components may be sealed at the construction site using tape, gaskets, spray foam, or caulk. These methods negate the advances in productivity and quality that have been achieved at prefab plants where the component modules and panels are manufactured. Therefore, a need exists for an improved system and method of sealing the joints between prefab components.

SUMMARY OF THE INVENTION

A joint sealing system for prefabricated building components and a method of joining and sealing two prefabricated building components are provided. The joint sealing system and method include a preinstalled sealant composition that may be integrated into the prefab components at the manufacturing facility at which the components are individually assembled, rather than being applied at the jobsite at which the components are joined to build a structure. Alternatively, the preinstalled sealant composition may be applied on the prefab components at the jobsite but prior to (hours, days) the components being assembled together. The preinstalled sealant composition does not react and cure until the components are joined on the jobsite. Thus, the preinstalled sealant composition can eliminate the need for the installer/construction worker to dispense and apply a sealant at the jobsite, thereby saving time, increasing productivity, reducing cost, improving quality, and in turn increasing energy efficiency. Additionally, the preinstalled sealant composition is minimally affected by surface contaminants such as dust because the final adhesion strength is dictated by the chemical reaction that occurs when the building components are assembled at the jobsite. The preinstalled sealant composition also has adequate adhesion strength to various construction materials, low air and water permeability, low volatile organic compound (VOC) emissions, as well as sufficient expansion and contraction capabilities to withstand environmental variables such as changes in temperature and building movement.

In particular embodiments, the joint sealing system includes a first component including a first surface. A second component including a second surface is mateable with the first surface. The first and second surfaces define a joint. A sealant composition is disposed on one of the first surface or the second surface. Pressure exerted when the second surface is mated with the first surface triggers curing of the sealant composition to join the first and second components and to seal the joint between the first and second components.

In certain embodiments, the first surface may include a male connector and the second surface may include a female connector. The joint may be, for example, a tongue-and-groove joint. Alternatively, the joint may be a butt joint that does not include male and female connectors, and instead the first and second surfaces are flat and are abutted against each other to form the joint. The sealant composition may either be disposed in the female connector or disposed adjacent the male connector, or in the case of a butt joint may be disposed on either the first surface or the second surface. The sealant composition may be a preinstalled sealant that is disposed on the first surface or the second surface during manufacturing of the first or second component, or prior to the use of the assembly together of the first and second components.

In certain embodiments, the sealant composition includes a first component including a curing agent and a polymer matrix, and a second component that includes a microcapsule having a resin encapsulated inside a shell. The microcapsule is dispersed in the first component. Breaking of the microcapsule shell by an applied force allows the curing agent to react with the resin to cure the sealant composition.

In specific embodiments, the polymer matrix may be a healable polymer that is a copolymer including an acrylate monomer unit having a low glass transition temperature ($T_g$) and a methacrylate monomer unit having a high glass transition temperature ($T_g$). The healable polymer may include, for example, one or both of butyl acrylate (BA) and/or 2-ethylhexyl acrylate (2-EHA) combined with methyl methacrylate (MMA) in a ratio of between 95:5 and 50:50.

In specific embodiments, the curing agent may include one or more of diamine-type curing agents and diol-type curing agents, and the resin may include one or more of epoxy-based resins, acrylic-based resins, and aliphatic and/or aromatic isocyanate-based resins. The curing agent may be one or more selected from materials including but not limited to a PPG/PEG-diamine, a PPG-di(secondary amine), a PPG/PEG-triamine, a polyethyleneimine (PEI), and a PPG/PEG-diol. For example, the curing agent may be (i) a combination of a PPG/PEG-triamine and polyethyleneimine (PEI) wherein the amount of PEI is between 0 and 40% by weight; (ii) a combination of a PPG/PEG-diamine and a PPG/PEG-diol wherein the amount of PPG/PEG-diol is between 0 and 60% by weight; and (iii) a combination of a PPG-di(secondary amine) and a PPG/PEG-diol wherein the amount of PPG/PEG-diol is between 0 and 60% by weight. The resin may be one or more selected from materials including but not limited to a bisphenol A epoxy, a novolac epoxy, an acrylated novolac epoxy, a bio-based epoxy, an aliphatic di-isocyanate, an aromatic di-isocyanate, a bio-based di-isocyanate, a diacrylate, and a triacrylate.

In specific embodiments, the microcapsule may have a diameter in the range of 10 to 1000 μm and a shell thickness of between 1 and 50 μm.

In specific embodiments, the curing agent may cure the resin in less than 8 hours, and the resin may be fully cured within 21 days at a temperature between 20 and 100° F. The cured sealant composition may have an adhesion strength of at least 15 pounds/inch.

A method of joining and sealing two prefabricated building components is also provided. The method includes providing a first component having a first surface. The method also includes providing a second component having a second surface that is mateable with the first surface, the first and second surfaces defining a joint. The method further includes disposing a sealant composition on one of the first surface or the second surface. The method further includes joining the first component with the second component by mating the first surface with the second surface, whereby a force is applied to the sealant composition, causing the microcapsules to rupture such that the resin mixes with the curing agent and the sealant composition cures to seal the joint between the first component and the second component.

In particular embodiments, one or both of the components may be fabricated at a location different than the location at which the components are assembled together, and the sealant composition may be preinstalled by being disposed on one of the components at the different location at which the components are fabricated.

These and other features of the invention will be more fully understood and appreciated by reference to the description of the embodiments and the drawings.

DETAILED DESCRIPTION OF THE CURRENT EMBODIMENTS

Figure 1:
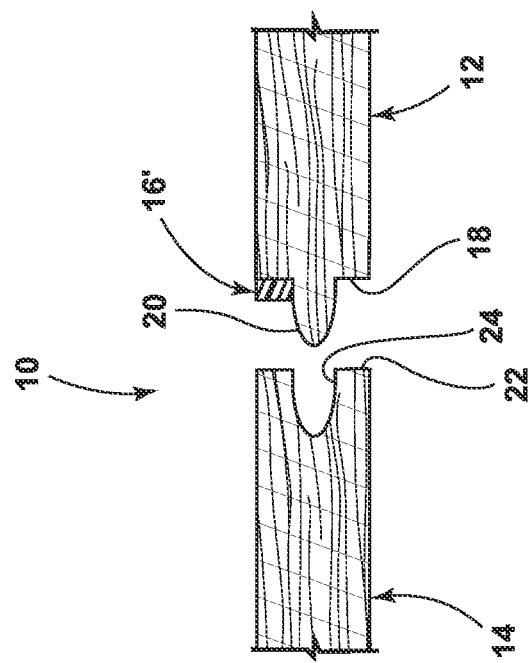
FIG. 1 is a schematic view of a joint sealing system including a preinstalled sealant composition in accordance with some embodiments of the disclosure.

As discussed herein, the current embodiments relate to a joint sealing system 10 and a method of joining and sealing two components such as but not limited to prefabricated building components. As generally illustrated in FIG. 1, the joint sealing system 10 includes a first component 12, a second component 14, and a sealant composition 16. The sealant composition provides continuity for the air and moisture barrier between the two components when these components are joined together on a construction site. The sealant composition also decreases labor performed on a job site, thereby increasing productivity and lowering cost.

Figure 2:
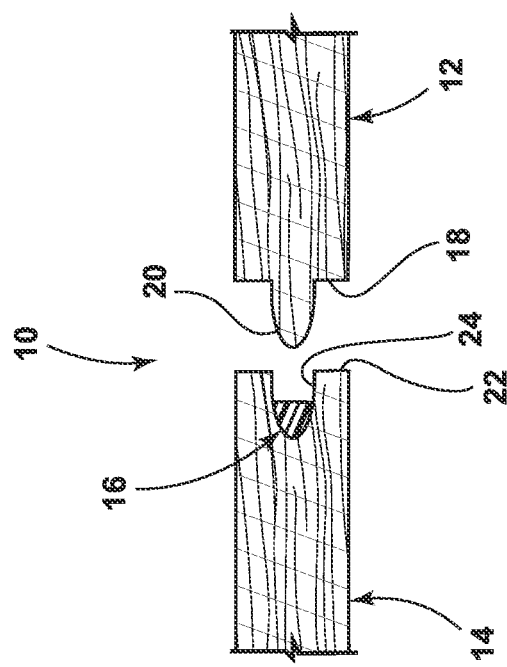
FIG. 2 is a schematic view of the joint sealing system in accordance with other embodiments of the disclosure.

The first component 12 has a first surface 18 including a male connector 20. The male connector 20 may be, for example, a tongue, a ridge, or other similar protrusion that is elevated relative to neighboring portions of the first surface 18. The second component 14 has a second surface 22 that includes a female connector 24. The female connector 24 may be, for example, a groove, slot, or other similar depression or recess that is recessed relative to neighboring portions of the second surface 22. Hence, the male and female connectors 20, 24 may cooperate such that the male connector is sized and shaped (dimensioned) so as to be inserted into and received by the female connector to mate the first surface 18 with the second surface 22 and join the first and second components 12, 14. In some embodiments, the male and female connectors define a tongue-and-groove joint arrangement. The sealant composition 16 is disposed on either the first surface 18 or the second surface 22. As shown in FIG. 1, the sealant composition 16 may be disposed in the groove 24. Alternatively, as shown in FIG. 2, the sealant 16' may be disposed on or adjacent the tongue 20. The maximum width of the preinstalled sealant composition 16, 16' may be, for example, between ½ inch and ¾ inch if the joint is a tongue-and-groove joint in a sheathing such as oriented strand boards (OSB). If other, thicker materials than OSB are used, the width of the sealant application may be larger than these dimensions.

The first and second components 12, 14 may be formed of oriented strand boards (OSB) which are commonly used for prefabricated construction. However, the material of construction is not limited to OSB, and the components may be formed partially or wholly from other materials such as metal, lumber, and the like. The choice of material may affect the amount of sealant necessary to be applied to the first or second surface. Each of the first and second components may be fabricated at a manufacturing plant that is at a location different than the location at which the components are assembled together as part of the construction of a building such as a residential building. In other words, the manufacturing facility for the components is offsite and located separate from the jobsite at which the components are used for construction. The first and second components are also produced at a time prior to shipment and use at a jobsite. Hence, the first and second components are prefabricated. The first and second components may be used and combined together to form various portions of a building, such as the floors, the walls, and the roof. Hence, the first and second components may be modular. The sealant composition 16 may be integrated into the first or second component during fabrication of the components at the manufacturing facility. For example, the sealant composition 16 may be applied to the groove 24 that is machined into the second surface 22 of the second modular component 14 using automated machinery. Hence, in this case the sealant composition 16 is preinstalled as it is disposed on the modular component prior to the modular component being shipped to and used at a jobsite. Alternatively, the sealant composition may be installed at a jobsite and triggered some time (e.g., a day or days, a week) after application when the two components 12, 14 are joined together, such that the sealant composition is "preinstalled" prior to its immediate use.

Figure 3:
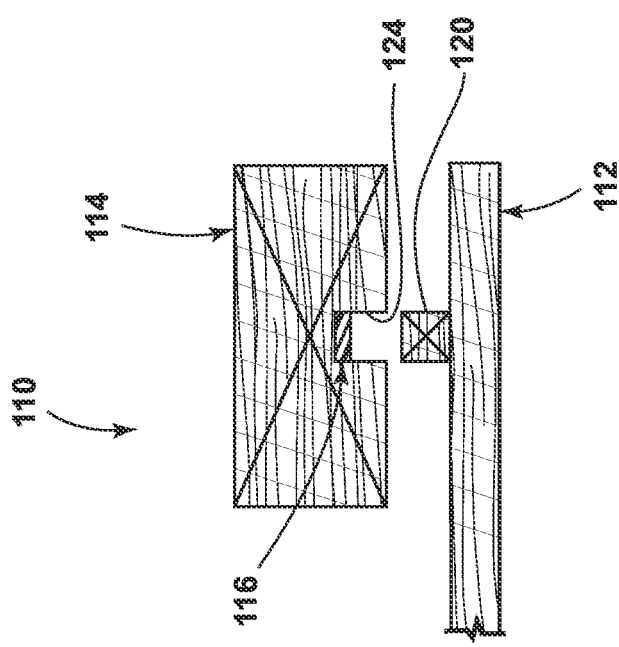
FIG. 3 is a schematic view of the joint sealing system in accordance with other embodiments of the disclosure.

In certain embodiments shown in FIG. 3, the first component 112 of the joint sealing system 110 may be a section of OSB flooring, and the male connector 120 may be a protrusion such as a wood strip that is attached to the OSB flooring at the manufacturing plant. The second component 114 may be a bottom plate formed of wood, and the female connector 124 may be a groove/slot that is carved out of the bottom plate at the manufacturing plant using automated machinery. The sealant composition 116 may be applied into the groove/slot at the manufacturing plant subsequent to the machining of the groove/slot. The two components are later joined at a jobsite by placing the groove of the bottom plate on the wood strip of the flooring panel.

Figure 4:
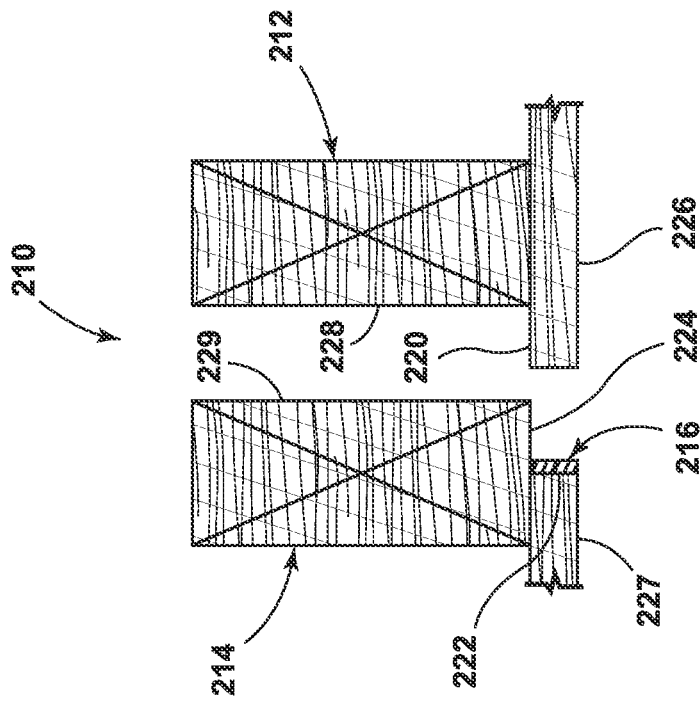
FIG. 4 is a schematic view of the joint sealing system in accordance with other embodiments of the disclosure.

In other embodiments shown in FIG. 4, the first and second components 212, 214 of the joint sealing system 210 may be prefabricated wall components each including a perimeter stud and an exterior OSB sheathing. In the first component 212, the edge of the sheathing 226 extends beyond the edge of the perimeter stud 228 to form the male connector 220 as a protrusion, while in the second component 214 the edge of the sheathing 227 is disposed within the edge of the perimeter stud 229 to form the female connector 224 as a notch. The sealant composition 216 may be disposed along the edge surface 222 of the second component 214. The two wall components are later joined at a jobsite by overlapping the female connector 224 with the male connector 220 such that the protrusion is inserted into the notch.

Alternatively, the first surface of the first component may not include a male connector, and the second surface of the second component may not include a female connector. In this case, the first and second surfaces together define a butt joint wherein the first surface abuts the second surface to sandwich the sealant composition thereby joining the first and second components.

As described in more detail below, the sealant composition 16 is activated by the application of force. Particularly, when the first component 12 is mated with the second component 14 by inserting the male connector 20 into the female connector 24 and/or by abutting the first surface to the second surface, a force (pressure) is applied to the sealant composition 16 as it is pressed between the two components. The force triggers the sealant composition by rupturing microcapsules present in the sealant composition, allowing the contents of the microcapsules to mix with the other component(s) of the composition in order to cure the composition. Curing of the composition joins the first component 12 to the second component 14 and seals the joint between the two components.

Figure 5:
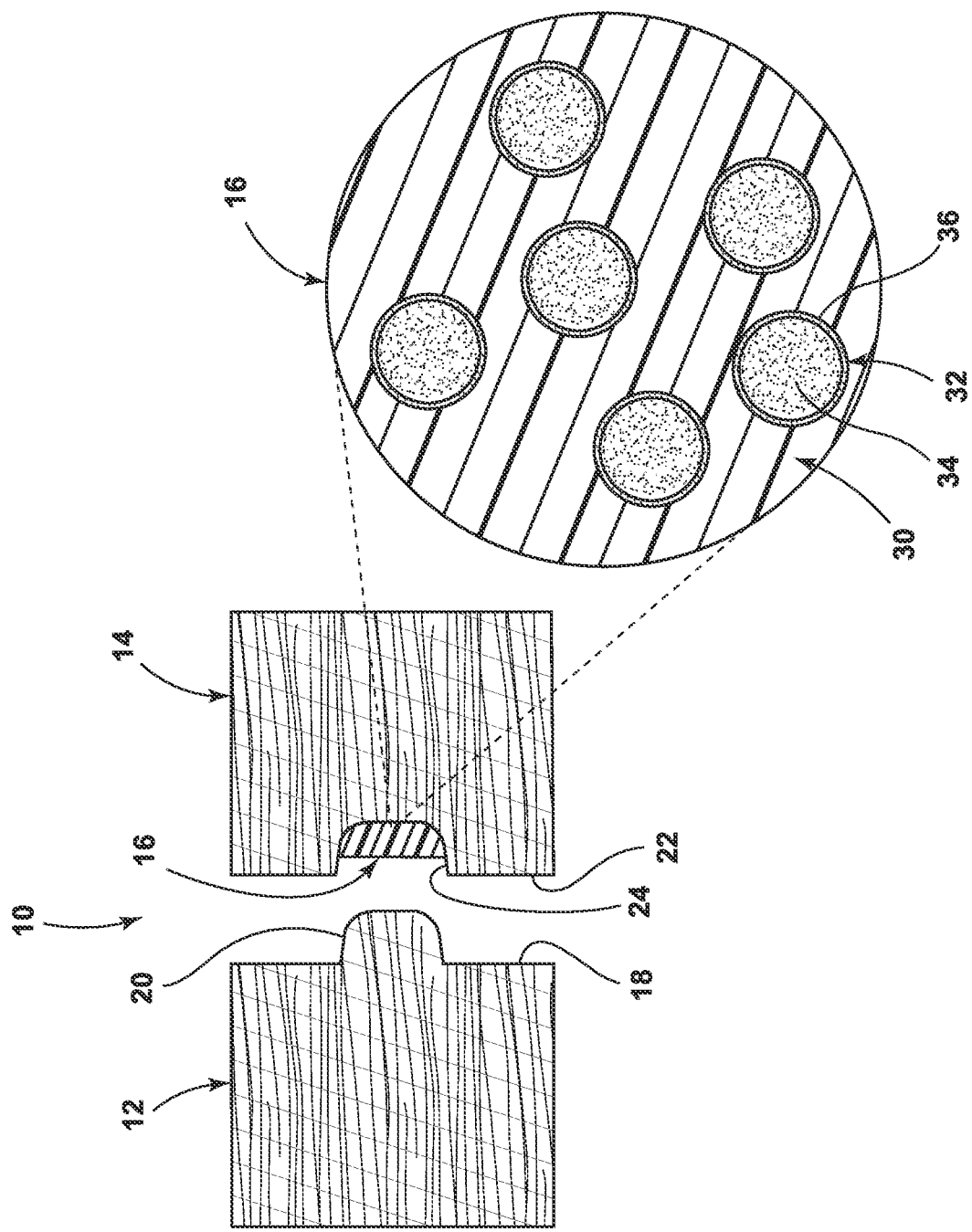
FIG. 5 is a schematic, partially enlarged view of the joint sealing system including the preinstalled sealant composition.

The sealant composition is a two-component curing system that is one or more of an epoxy-based system, an acrylic-based system, an aliphatic isocyanate-based system, and an aromatic isocyanate-based system. As shown schematically in FIG. 5, the sealant composition 16 includes a first component 30 and a second component 32. The first component 30 comprises a curing agent and a polymer matrix. The curing agent may include one or more of diamine-type curing agents and diol-type curing agents. The second component 32 comprises a microcapsule having a reactive agent 34 that is a resin encapsulated inside a shell 36. The resin may include one or more of epoxy-based resins, acrylic-based resins, and aliphatic and/or aromatic isocyanate-based resins. The microcapsule is dispersed in the first component. Any combination of the diamine and diol curing agents may be utilized with any combination of the epoxy, acrylic, and isocyanate-based resin reactive agents, although in the case of acrylic resin, the curing agent cannot be 100% diol (acrylic based resins do not react with 100% diol-based curing agents). Breaking of the microcapsule shell by an applied force allows the curing agent to react with the resin to cure the sealant composition.

The polymer matrix of the first component may be a healable polymer. The healable polymer is a stretchable (>100%) elastomer that can recover its mechanical performance after tearing. For example, a film of the healable polymer cut into two pieces and allowed to have intimate contact will exhibit complete recovery of its mechanical performance after, for example, a period of 24 hours. The healable polymer also has a low glass transition temperature ($T_g$) that is lower than room temperature, such as lower than 20° C., alternatively lower than 10° C., alternatively lower than 5° C. The healable polymer can significantly extend the lifetime of the cured sealant composition by allowing the cured sealant to self-heal after being subjected to a force that fractures the cured sealant. The healable polymer may be a polymer made from acrylate or methyl-acrylate monomers including a copolymer of one or more acrylates having a low $T_g$ (e.g., a $T_g$ of less than 0° C., more preferably less than −40° C.) and one or more methacrylates having a high $T_g$ (e.g., a $T_g$ of greater than 0° C., more preferably greater than 20° C., more preferably greater than 60° C., even more preferably greater than 100° C.). For example, the healable polymer may be formed of any combination of butyl acrylate (BA) and/or 2-ethylhexyl acrylate (2-EHA) with methyl methacrylate (MMA) in a ratio of between 95:5 and 50:50, such as but not limited to 95:5, 90:10, 85:15, 80:20, 75:25, 70:30, 65:35, 60:40, 55:45, or 50:50. However, the acrylates used to form the healable polymer are not limited to BA and EHA, and the methacrylate is not limited to MMA, and may include other methacrylate monomers having, for example, a $T_g$ greater than 25° C.

The curing agent of the first component may generally be an amine polymer or a hydroxyl polymer either derived from petroleum or bio-based feedstock. The curing agent may be a single amine polymer, a mixture of amine polymers, a single hydroxyl polymer (polyol), a mixture of hydroxyl polymers, or a mixture of amine polymer(s) and hydroxyl polymer(s). The reaction rate can be tuned, i.e. sped up or slowed down, by adjusting a ratio of the polymers used such as the ratio of amine polymer to hydroxyl polymer. Amine polymers react more quickly with the reactive agent while hydroxyl polymers react more slowly. Therefore, increasing the amount of amine polymer relative to hydroxyl polymer will lead to a faster reaction, whereas increasing the amount of hydroxyl polymer relative to amine polymer will lead to a slower reaction. In certain embodiments, the curing agent may be one or more of a polypropylene glycol (PPG)-diamine such as poly(propylene glycol) bis(2-aminopropyl ether), a polyethylene glycol (PEG)-diamine, a PPG-di (secondary amine), a PPG-triamine such as trimethylolpropane tris [poly(propylene glycol), amine terminated], a PEG-triamine, a polyethyleneimine (PEI), a PPG-diol (PPG-di-OH), a PEG-diol, a polyetheramine (e.g., Jeffamine SD-2001), and a PPG-di(secondary amine) (e.g., Jeffamine 400-2000). In particular embodiments, the curing agent may include one of (i) a combination of a PPG/PEG-triamine and polyethyleneimine (PEI) in which the amount of PEI is between 0 and 40% by weight; (ii) a combination of a PPG/PEG-diamine and a PPG/PEG-diol in which the amount of PPG/PEG-diol is between 0 and 60% by weight; and (iii) a combination of a PPG-di(secondary amine) and a PPG/PEG-diol in which the amount of PPG/PEG-diol is between 0 and 60% by weight. In specific embodiments, the curing agent may include polyethylenimine (PEI) and trimethylolpropane tris [poly (propylene glycol), amine terminated] (PPG-triamine) in a ratio of 0:100 to 10:90 by weight. In other specific embodiments, the curing agent may include poly(propylene glycol) bis(2-aminopropyl ether) (PPG-di-amine) and poly(propylene glycol) (PPG-di-OH) in a ratio of 60:40 to 100:0 by weight. In other specific embodiments, the curing agent may include a polyetheramine (Jeffamine SD-2001) and poly(propylene glycol) (PPG-di-OH) in a ratio of 60:40 to 100:0.

The microcapsules of the second component encapsulate the resin that reacts with the curing agent when the shells of the microcapsules are ruptured. In other words, each microcapsule has a core comprised of the curing agent and a polymer shell that separates the reactive agent from the curing agent in the sealant composition to prevent curing until a force is applied to break the polymer shell, allowing the reactive agent to mix with the curing agent. The resin comprising the reactive agent may be one or more of an aliphatic isocyanate, an aromatic isocyanate, an epoxy, and an acrylate. The resin may be either derived from petroleum or bio-based feedstock. In certain embodiments, the resin may be one or more selected from a bisphenol A epoxy such as bisphenol A diglycidyl ether, a novolac epoxy such as EPON 160/161, an acrylated novolac epoxy such as EPON 8111, a bio-based epoxy such as an epoxidized soybean oil, an aliphatic di-isocyanate such as a hexamethylene diisocyanate (HDI) prepolymer, an aromatic di-isocyanate such as a methylene diphenyl diisocyanate (MDI) prepolymer, a bio-based di-isocyanate such as a lysine di-isocyanate, and a diacrylate such as hexanediol diacrylate.

The microcapsules may be formed by adding organic droplets of the reactive agent to a surfactant-containing aqueous solution, and subsequent in-situ polymerization of a monomer around the peripheries of the droplets to form the shells. An epoxy or a urethane system may be utilized to form the shell. Further, a polyurethane shell may be formed by in-situ crosslinking of an isocyanate-terminated prepolymer such as one or more of a multi-isocyanate and di-isocyanate with one or more di- or multi-hydroxyl precursor materials, building blocks, oligomers, or polymers polymer. The size of the microcapsules and the thickness of the shell of the microcapsules affect the amount of pressure required to rupture the shell and release the reactive agent into the curing agent. These two factors may be tuned to control the rupture force required. In general, the mechanical strength of the microcapsules should be high enough so that regular handling before and after installation on the prefabricated components does not break the microcapsules, but weak enough so that the microcapsules break under the typical forces that are applied when two prefabricated components are joined. The microcapsule diameter can be controlled, for example, by varying the agitation rates of the mechanical stirrer in the chemical reactor in which the microcapsules are formed, by varying the feed rate of the organic resin that comprises the reactive agent into the aqueous solution during emulsion polymerization, and by varying the surfactant content in the aqueous solution. The thickness and mechanical robustness of the microcapsule shell may be tuned by varying the chemical composition and crosslinking density of the shell such as by adjusting the feed ratio of di-isocyanate and tri-isocyanate. The shell thickness can also be controlled by varying the reaction time or by varying the amount of di- or multi-hydroxyl terminal agents. In some embodiments, the resulting microcapsules have a diameter in the range of 10 to 1000 μm and a shell thickness of between 1 and 50 μm. The triggering force needed to break the shells may be in the range of 100 to 2000 N, and the triggering pressure may be in the range of 20 to 100 psi, alternatively 10 to 100 psi, alternatively 5 to 100 psi.

Figure 6:
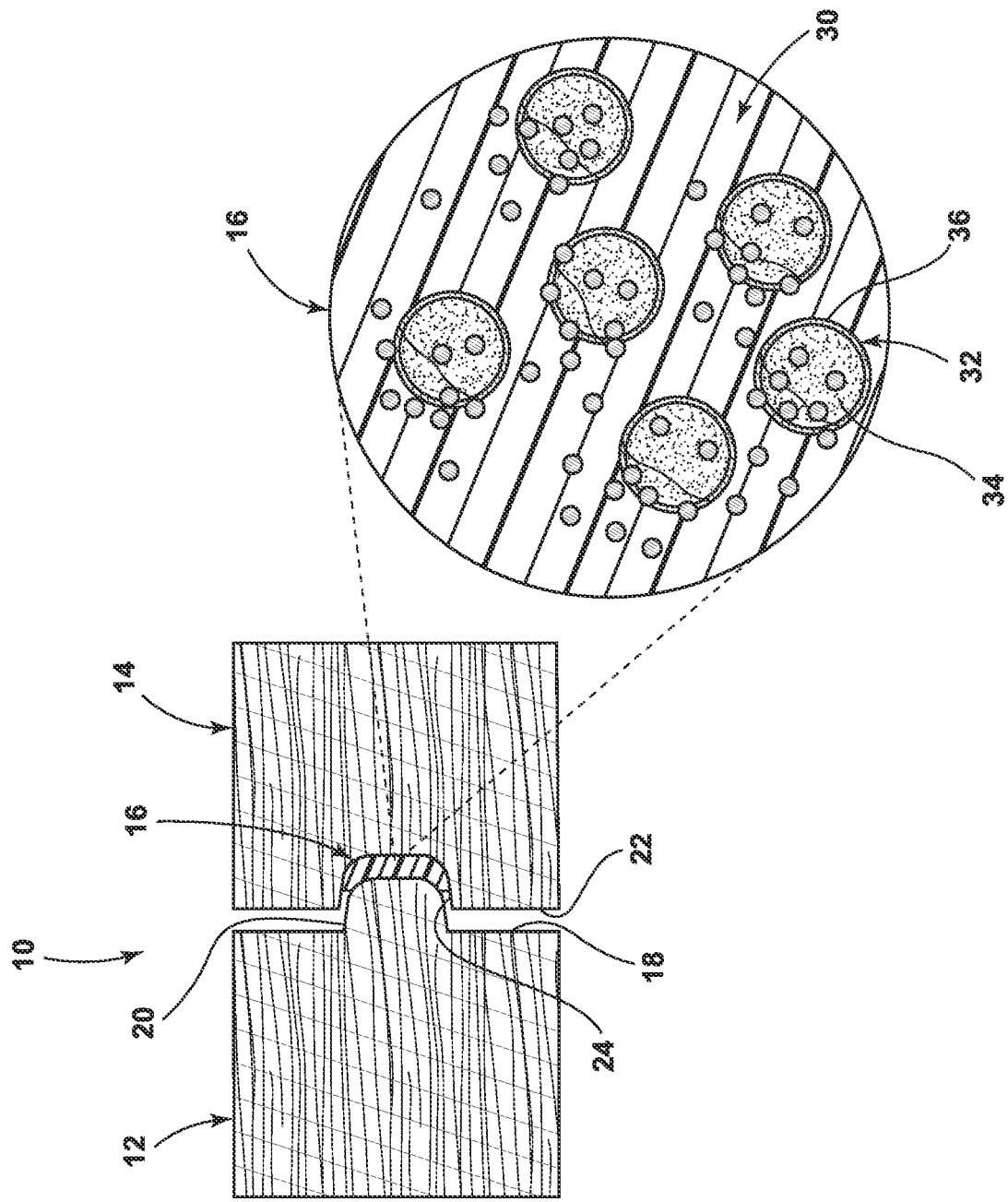
FIG. 6 is a schematic, partially enlarged view of the joint sealing system of FIG. 5 illustrating mating of the joint causing rupture of microcapsules included in the preinstalled sealant composition.
Figure 7:
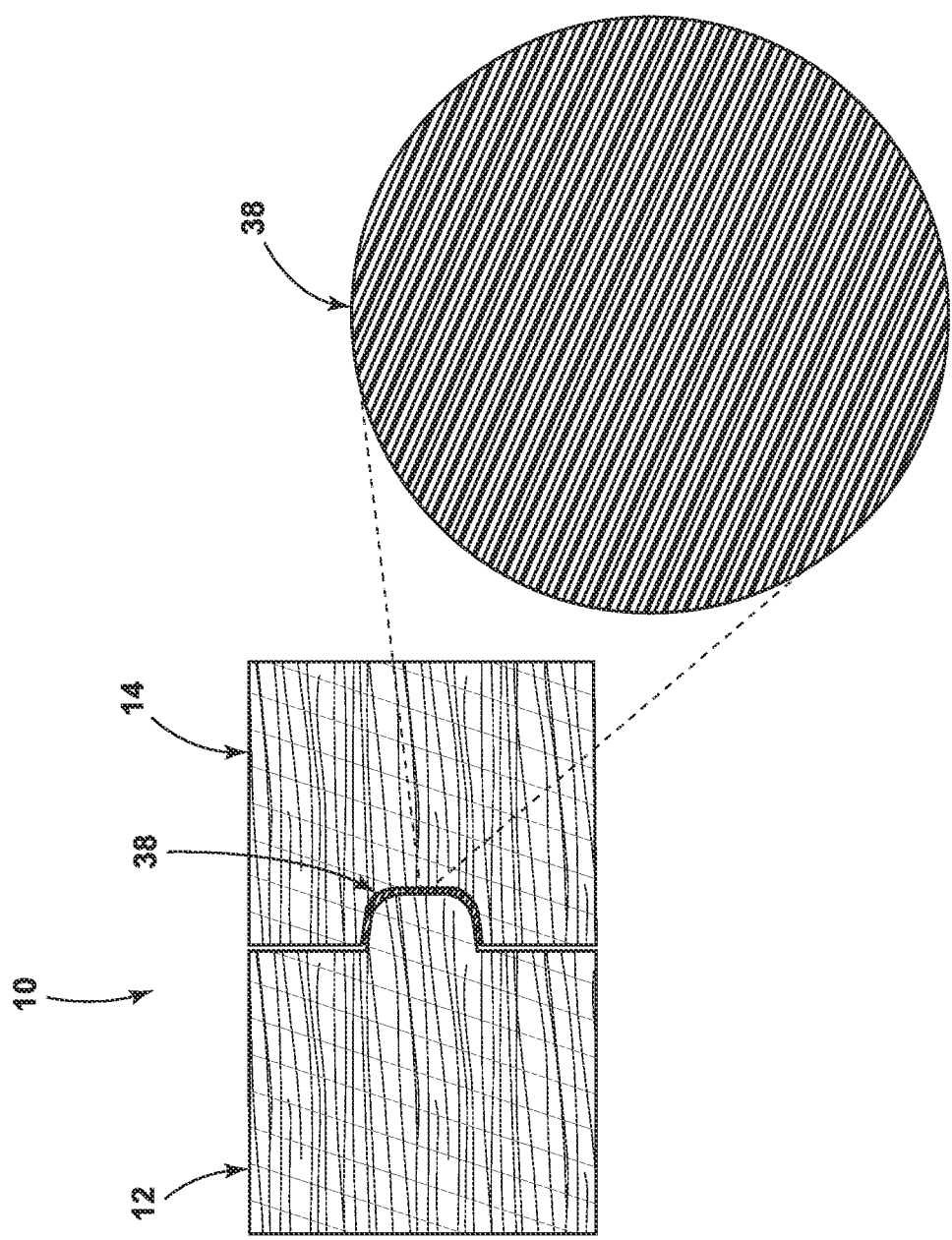
FIG. 7 is a schematic, partially enlarged view of the joint sealing system of FIG. 5 illustrating the preinstalled sealant composition being fully cured after rupture of the microcapsules.

As discussed above, in the joint sealing system, the first prefabricated component 12 can be mated and joined with the second prefabricated component 14. Joining of the two components 12, 14 compresses the sealant composition 16 between the first and second surfaces 18, 22 including the male and female connectors 20, 24. The compressive force exerted by sandwiching the sealant composition between the two components 12, 14 ruptures the microcapsules 32 thereby releasing the reactive agent 34 from inside the shells 36 into the curing agent 30 as shown schematically in FIG. 6. Breaking of the microcapsules and mixing of the reactive agent with the curing agent triggers the chemical reaction between the reactive agent and the curing agent to cure the sealant composition. After the triggering of the chemical reaction, the sealant composition becomes cured in a time period of less than 8 hours at ambient temperature (e.g., between 20 and 100° F.) and should be tack-free (as defined by ASTM C679) in approximately 2 hours or less. Further, the two components may be shifted or slid relative to each other within a 1-hour time window after curing has begun, and may be separated from each other within a 30-minute time window after curing has begun. The sealant composition is fully cured within 1 to 21 days, more preferably within 1 to 7 days, even more preferably within 2 to 5 days, at a temperature of between 20 and 100° F. as shown schematically in FIG. 7 (fully cured 38 sealant composition joining and sealing the first and second modular components 12, 14). The fully cured sealant composition has a peel/adhesion strength of at least 15 lbs/inch, more preferably at least 20 lbs/inch (89.0 N/inch), a maximum cured elongation (as defined by ASTM D412) of between 50 and 500%, preferably at least 200%, and a life expectancy of at least 10 years, more preferably at least 15 years, and even more preferably at least 20 years.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A joint sealing system for prefabricated building components comprising:
   a first component including a first surface;
   a second component including a second surface that is mateable with the first surface, said first and second surfaces defining a joint; and
   a sealant composition disposed on one of the first surface or the second surface, the sealant composition comprising:
      a first component including a curing agent and a polymer matrix, the curing agent including one or more of diamine-type curing agents and diol-type curing agents; and
      a second component that includes a microcapsule having a resin encapsulated inside a shell, the resin including one or more of epoxy-based resins, acrylic-based resins, aliphatic isocyanate-based resins, and aromatic isocyanate-based resins, and the microcapsule being dispersed in the first component;
      wherein breaking of the microcapsule shell by an applied force allows the curing agent to react with the resin to cure the sealant composition;
   wherein pressure exerted when the second surface is mated with the first surface triggers curing of the sealant composition to join the first and second components and to seal the joint between the first and second components.

2. The joint sealing system of claim 1, wherein the first surface includes a male connector and the second surface includes a female connector.

3. The joint sealing system of claim 2, wherein the sealant composition is either: (i) disposed in the female connector; or (ii) disposed adjacent the male connector.

4. The joint sealing system of claim 1, wherein the joint is one selected from (i) a tongue-and-groove joint; or (ii) a butt joint.

5. The joint sealing system of claim 1, wherein the sealant composition is a preinstalled sealant that is disposed on the first surface or the second surface during manufacturing of the first or second component.

6. The joint sealing system of claim 1, wherein the polymer matrix is a healable polymer that is a copolymer including an acrylate monomer unit having a low glass transition temperature ($T_g$) and a methacrylate monomer unit having a high glass transition temperature ($T_g$).

7. The joint sealing system of claim 6, wherein the healable polymer includes one or both of butyl acrylate (BA) and 2-ethylhexyl acrylate (2-EHA) combined with methyl methacrylate (MMA) in a ratio of between 95:5 and 50:50.

8. The joint sealing system of claim 1, wherein the curing agent is one or more selected from a PPG/PEG-diamine, a PPG-di (secondary amine), a PPG/PEG-triamine, a polyethyleneimine (PEI), and a PPG/PEG-diol.

9. The joint sealing system of claim 8, wherein the curing agent is (i) a combination of a PPG/PEG-triamine and polyethyleneimine (PEI) wherein the amount of PEI is between 0 and 40% by weight; (ii) a combination of a PPG/PEG-diamine and a PPG/PEG-diol wherein the amount of PPG/PEG-diol is between 0 and 60% by weight; and (iii) a combination of a PPG-di (secondary amine) and a PPG/PEG-diol wherein the amount of PPG/PEG-diol is between 0 and 60% by weight.

10. The joint sealing system of claim 1, wherein the resin is one or more selected from a bisphenol A epoxy, a novolac epoxy, an acrylated novolac epoxy, a bio-based epoxy, an aliphatic di-isocyanate, an aromatic di-isocyanate, a bio-based di-isocyanate, a diacrylate, and a triacrylate.

11. The joint sealing system of claim 1, wherein the curing agent cures the resin in less than 8 hours and the resin is fully cured within 21 days at temperature between 2° and 100° F.

12. The joint sealing system of claim 1, wherein the cured sealant composition has an adhesion strength of at least 15 pounds/inch.

13. The joint sealing system of claim 1, wherein the microcapsule has a diameter in the range of 10 to 1000 μm and a shell thickness of between 1 and 50 μm.

14. A method of joining and sealing two prefabricated building components, the method comprising:
   providing a first component having a first surface;
   providing a second component having a second surface that is mateable with the first surface, the first and second surfaces defining a joint;
   disposing a sealant composition on one of the first surface or the second surface, the sealant composition comprising:
      a first component including a curing agent and a polymer matrix, the curing agent including one or more of diamine-type curing agents and diol-type curing agents; and
      a second component that includes a microcapsule having a resin encapsulated inside a shell, the resin including one or more of epoxy-based resins, acrylic-based resins, aliphatic isocyanate-based resins, and aromatic isocyanate-based resins, and the microcapsule being dispersed in the first component;
      wherein breaking of the microcapsule shell by an applied force allows the curing agent to react with the resin to cure the sealant composition; and
   joining the first component with the second component by mating the first surface with the second surface, whereby a force is applied to the sealant composition, causing the microcapsules to rupture such that the resin mixes with the curing agent and the sealant composition cures to seal the joint between the first component and the second component.

15. The method of claim 14, wherein one or both of the components are fabricated at a location different than the location at which the components are assembled together, and the sealant composition is preinstalled by being disposed on one of the components at the said different location at which the components are fabricated.

16. A joint sealing system for prefabricated building components comprising:
   a first component including a first surface;

a second component including a second surface that is mateable with the first surface, said first and second surfaces defining a joint; and a sealant composition disposed on one of the first surface or the second surface, the sealant composition comprising:
 a first component including a curing agent and a polymer matrix, the polymer matrix being a healable polymer that is a copolymer including an acrylate monomer unit having a low glass transition temperature ($T_g$) and a methacrylate monomer unit having a high glass transition temperature ($T_g$); and
 a second component that includes a microcapsule having a resin encapsulated inside a shell, the microcapsule being dispersed in the first component;
 wherein breaking of the microcapsule shell by an applied force allows the curing agent to react with the resin to cure the sealant composition;

wherein pressure exerted when the second surface is mated with the first surface triggers curing of the sealant composition to join the first and second components and to seal the joint between the first and second components.

17. The joint sealing system of claim 16, wherein the healable polymer includes one or both of butyl acrylate (BA) and 2-ethylhexyl acrylate (2-EHA) combined with methyl methacrylate (MMA) in a ratio of between 95:5 and 50:50.

18. The joint sealing system of claim 16, wherein the curing agent cures the resin in less than 8 hours and the resin is fully cured within 21 days at temperature between 2° and 100° F.

19. The joint sealing system of claim 16, wherein the cured sealant composition has an adhesion strength of at least 15 pounds/inch.

20. The joint sealing system of claim 16, wherein the microcapsule has a diameter in the range of 10 to 1000 μm and a shell thickness of between 1 and 50 μm.

* * * * *